(12) United States Patent
Takumi (10) Patent No.: US 10,496,755 B2
(45) Date of Patent: Dec. 3, 2019

(54) INFORMATION PROCESSING APPARATUS, INFORMATION PROCESSING METHOD, AND NON-TRANSITORY COMPUTER READABLE MEDIUM STORING PROGRAM

(71) Applicant: FUJI XEROX CO., LTD., Tokyo (JP)

(72) Inventor: Satoshi Takumi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/237,187

(22) Filed: Aug. 15, 2016

(65) Prior Publication Data

US 2017/0277685 A1 Sep. 28, 2017

(30) Foreign Application Priority Data

Mar. 25, 2016 (JP) .................................. 2016-061997

(51) Int. Cl.
*G06F 17/28* (2006.01)
*G06F 17/20* (2006.01)

(52) U.S. Cl.
CPC ...... *G06F 17/2872* (2013.01); *G06F 17/2827* (2013.01); *G06F 17/2836* (2013.01); *G06F 17/2854* (2013.01)

(58) Field of Classification Search
CPC .. G06F 17/2872; G06F 17/2827; G06F 17/28; G06F 17/2809; G06F 17/2818; G06F 17/2836; G06F 17/2845; G06F 17/2854; G06F 17/2881; G06F 17/289
USPC ........................ 704/1–10, 277, 236–237, 239
See application file for complete search history.

(56) References Cited

U.S. PATENT DOCUMENTS

| | | | | |
|---|---|---|---|---|
| 5,629,846 A | * | 5/1997 | Crapo ................... | G06F 17/211 708/705 |
| 5,848,386 A | * | 12/1998 | Motoyama ............ | G06F 17/272 704/5 |
| 6,490,548 B1 | * | 12/2002 | Engel .................. | G06F 17/2735 704/10 |
| 8,543,563 B1 | * | 9/2013 | Nikoulina ......... | G06F 17/30401 704/2 |
| 2006/0265209 A1 | * | 11/2006 | Bradford ............. | G06F 17/2809 704/9 |
| 2008/0077385 A1 | * | 3/2008 | Yamanaka .......... | G06F 17/2836 704/10 |
| 2009/0326913 A1 | * | 12/2009 | Simard ............... | G06F 17/2836 704/2 |
| 2015/0134319 A1 | * | 5/2015 | Chelly ................. | G06F 17/289 704/2 |

FOREIGN PATENT DOCUMENTS

JP H07-171995 A 7/1995

* cited by examiner

*Primary Examiner* — Dwayne D Bost
*Assistant Examiner* — Stephen M Brinich
(74) *Attorney, Agent, or Firm* — Oliff PLC (57) ABSTRACT

Provided is an information processing apparatus including a first reception unit that receives modification to a translation result of at least one first document from a user, a generation unit that generates a translation rule corresponding to the modification received by the first reception unit, a second reception unit that receives original texts of at least one second document, and a utilization unit that utilizes the translation rule generated by the generation unit at the time of translating the original texts received by the second reception unit, depending on relevance between the at least one first document and the second document.

7 Claims, 9 Drawing Sheets

| RULE | BEFORE SUBSTITUTION | AFTER SUBSTITUTION |
|---|---|---|
| R1 | "probability" | "OKORISOUNAKOTO" |
| R2 | "second" | "BYO" |
| R3 | "second" | "2BANME" |
| R4 | "XYZ Co." ",Ltb." | "XYZ Co. ,Ltb." |
| R5 | "A_b_c_d_e" | "Abcde" |
| ... | ... | ... |

| ATTRIBUTE ELEMENT / RULE | E1 | E2-1 | E2-2 | E3-1 | E3-2 | E3-3 | E3-4 |
|---|---|---|---|---|---|---|---|
| R1 | 0.67 | 1 | NONE | 1 | 1 | NONE | NONE |
| R2 | 1 | 1 | 1 | 1 | 1 | 1 | NONE |
| R3 | 1 | 1 | 1 | 1 | 1 | 1 | NONE |
| ... | ... | ... | ... | ... | ... | ... | ... |

INFORMATION PROCESSING APPARATUS, INFORMATION PROCESSING METHOD, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2016-061997 filed Mar. 25, 2016.

BACKGROUND

Technical Field

The present invention relates to an information processing apparatus, an information processing method, and a non-transitory computer readable medium storing a program.

SUMMARY

According to an aspect of the invention, there is provided an information processing apparatus including: a first reception unit that receives modification to a translation result of at least one first document from a user; a generation unit that generates a translation rule corresponding to the modification received by the first reception unit; a second reception unit that receives original texts of at least one second document; and a utilization unit that utilizes the translation rule generated by the generation unit at the time of translating the original texts received by the second reception unit, depending on relevance between the at least one first document and the second document.

BRIEF DESCRIPTION OF THE DRAWINGS

Exemplary embodiments of the present invention will be described in detail based on the following figures, wherein.

DETAILED DESCRIPTION

An information processing apparatus of the present example includes a first reception unit that receives modification to a translation result of at least one first document from a user; a generation unit that generates a translation rule corresponding to the modification received by the first reception unit; a second reception unit that receives original texts of at least one second document; and a utilization unit that utilizes the translation rule generated by the generation unit at the time of translating the original texts received by the second reception unit, depending on the relevance between the at least one first document and the second document. Hereinafter, the present example will be specifically described.

Figure 1:
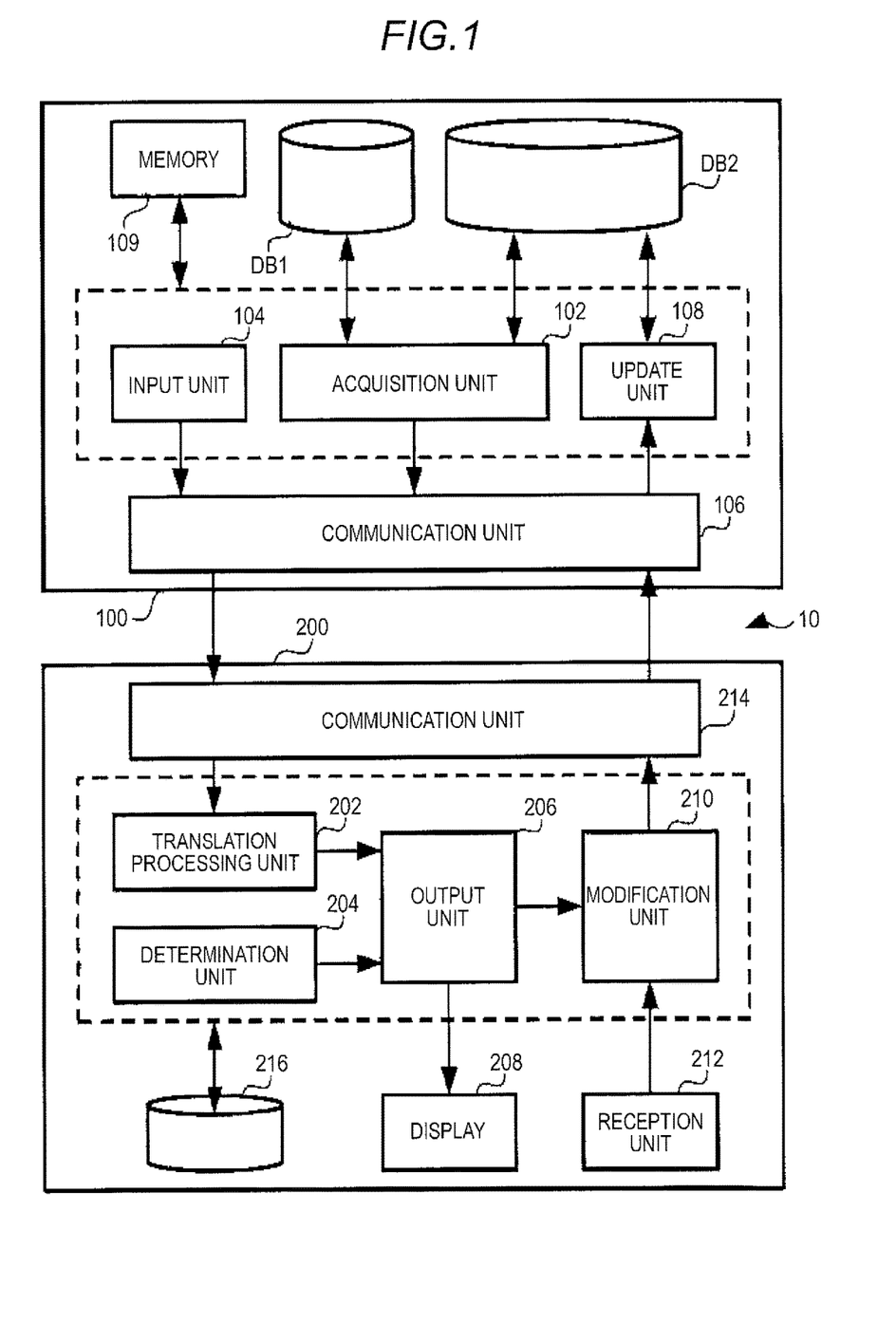
FIG. 1 is a view illustrating a functional construction of an information processing system.

FIG. 1 is a view illustrating a functional construction of the information processing system 10. The information processing system 10 includes an information processing apparatus 100 and an information processing apparatus 200. The information processing apparatus 100 and the information processing apparatus 200 are connected with each other via a LAN, the internet, a wireless relay device, or the like, which is not illustrated. The information processing apparatus 100 is a general-purpose computer or a server device, and includes an acquisition unit 102, an input unit 104 (an example of the second reception unit described above), a communication unit 106, and an update unit 108. The acquisition unit 102, the input unit 104, and the communication unit 106 are mounted as one processor for example.

The memory 109 is a semiconductor memory or a hard disk.

A program for implementing functions of the acquisition unit 102, the input unit 104, and the communication unit 106 is stored in the processor. In addition, document data for translation processing may be stored in the processor. The communication unit 106 is a communication interface for performing transmission and reception of information between the information processing apparatus 200 and the communication unit 106 wiredly or wirelessly.

The input unit 104 specifies an object document (original texts) for the translation processing based on a request from a user and acquires the document data. In addition, the input unit 104 acquires the information on attributes of the document.

Using FIG. 2, the attributes of the document will be described. The attributes of the document is information representing characteristics of the document rather than the contents of the document such as the field in which the contents of the document belong (architecture/physics/chemistry/politics/economy/sociology, or the like), a category (criticism/magazines/novels/paper, or the like) and is information that is used to assess the relationship with other documents.

The attributes of the document includes at least one attribute element. For example, in a case where document 1 is an internal company document, is written by the development department, and is a report on a literature on probability theory, the attribute information of document 1 includes an attribute element E1 of "development department", an attribute element E2-1 of "mathematics" among "mathematics" (an attribute element E2-1) and "development" (an attribute element E2-2) which are the attributes positioned directly below the development department, and an attribute element E3-1 of "probability theory" which is the attribute positioned below "mathematics".

Further, the setting of the attribute element or the determination of the attribute element (application of the attribute element) may be determined based on information contained in the document data itself, for example, or may be determined based on information (a distinguished name of a folder, in a case of a system in which a document is stored in a hierarchical folder by category, for example) in addition to information contained in the document data itself. In addition, FIG. 2 merely schematically illustrates a hierarchical structure, and a specific structure of the hierarchy such as the number or the contents of an attribute element is optional. In short, it is only necessary that the hierarchical structure has a comparable structure when relevance between plural documents is determined.

Returning to FIG. 1, the acquisition unit 102 acquires information representing rules for substitution of character strings which is applied to at least one first document. Specifically, a cluster of rules to be applied to the document of a processing object is extracted from the database DB1. The rules are generated according to modification to a translation result of at least one first document received from a user by the reception unit 212 to be described below.

Figure 3:
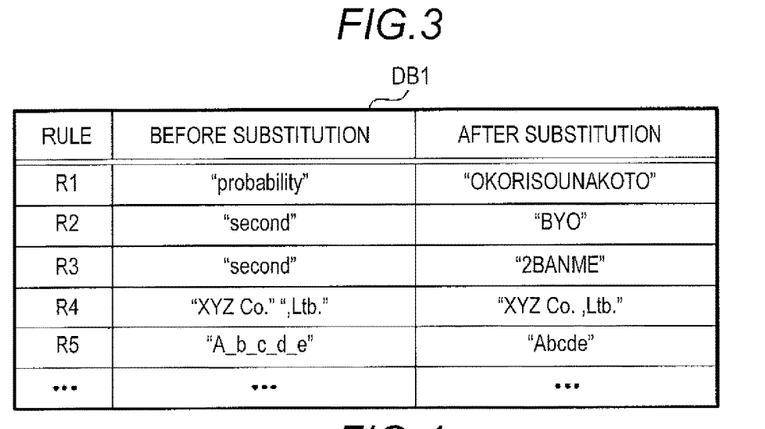
FIG. 3 is view illustrating an example of information stored in a database DB1.

FIG. 3 is a view illustrating an example of rules stored in a database DB1. Rules in which a corresponding relationship between a phrase of a first language and a phrase of a second language (substitution rules, R1, R2, and R3, so called dictionary data) is described is included in the database DB1. In addition, a rule regarding editing of document data that has no direct relationship with translation may be included in the database DB1. For example, a rule defining a relationship between before substitution and after substitution is included in plural words and character strings as a unit (substitution rules R4 and R5 in FIG. 3). The substitution rule R4 is processing removing a space between predetermined words.

The substitution rule R5 is processing removing a space between character strings satisfying a predetermined condition (meanwhile, "A", "b" "c" "d", and "e" are optional words). In addition, words before substitution are common and words after substitution are different from each other in the substitution rule R2 and the substitution rule R3 of FIG. 3.

The substitution rule R2 and the substitution rule R3 are registered as additional rules, and then are executed at the information processing system 10.

Further, only one dictionary data may be provided.

Plural dictionary data which include a cluster of plural rules may be stored and thus at least one dictionary data used according to the document of a processing object may be determined, Returning to FIG. 1, scores provided to the rules are stored to each attribute element constituting an attribute, each rule, based on an application number of times or an application proportion of the rule to at least one document in the past, or each component in the database DB2. The scores represent the application number of times or the application proportion of the rule to at least one document in the past which has an attribute including the component.

Figure 4:
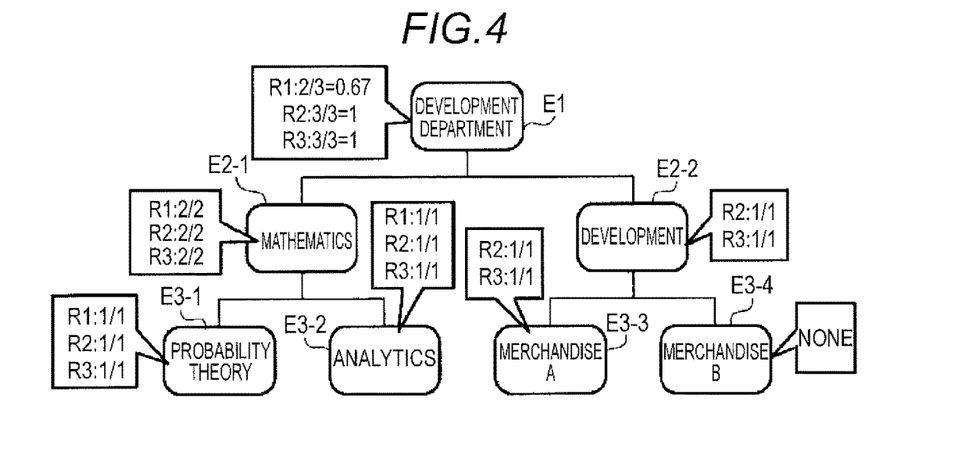
FIG. 4 is a schematic view illustrating score for rule in each of attribute elements.

FIG. 4 is a schematic view illustrating the scores. Here, each score represents an example defined as {approved number of times of the rule by a user (that is, number of times of the rule which is not canceled but approved)}÷ {employed number of times for rule in the information processing apparatus 200}. Further, "none" in FIG. 4 represents that a score of one rule is not yet registered in the attribute element. In other words, it is meant that as a value of the score is high, the rule is applied by the information processing apparatus 200 in the past and thus the probability that the application is valid is high. Since only one index is not introduced for one rule as described above but plural values corresponding to each attribute element are set, information on the relationship between the attribute of a document and the application validity of the rule is maintained in the database DB2.

Figure 5:
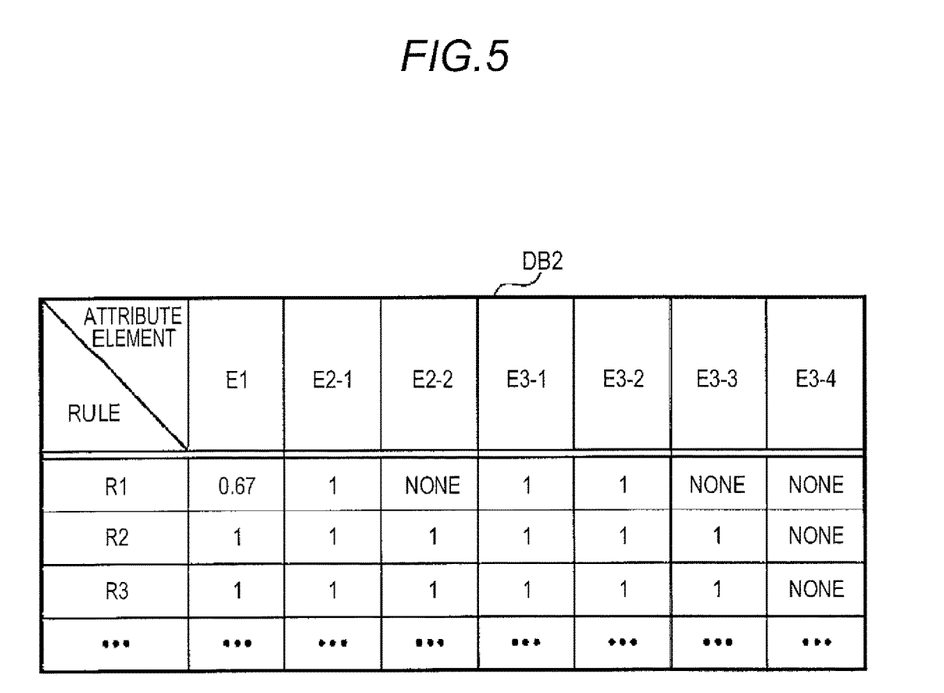
FIG. 5 is view illustrating an example of a structure of a database.

In a case of FIG. 4, an actual data structure stored in the database DB2 is as illustrated in FIG. 5, for example. In other words, a score corresponding to each attribute element is stored for each rule. Corresponding to the document of a processing object, a score of a part of a necessary rule and a necessary attribute element is read, and then is supplied to the information processing apparatus 200.

Returning to FIG. 1, the update unit 108 updates the score stored in the database DB2, based on the information sent from the information processing apparatus 200 according to completion of the translation processing.

The information processing apparatus 200 is a general-purpose computer apparatus, for example and includes a translation processing unit 202, a determination unit 204 and an output unit 206 (these correspond to the utilization unit), a display 208, a modification unit 210 (an example of the generation unit), a reception unit 212 (corresponding to the first reception unit and the third reception unit), and a communication unit 214.

The translation processing unit 202 performs substitution or the like of character strings by performing a morphological analysis according to a predetermined algorism to the document data of the processing object and generates a translation document.

The determination unit 204 utilizes the generated translation rule at the time of translation of received original texts according to the relevance between at least one first document and second document. Specifically, the determination of whether or not the rule is applied to the second document is performed based on the relationship between at least one first document in the past and the second document which is a processing object and information on whether or not the rule related to the at least one first document in the past is at least applied.

The relevance is determined based on the attribute information having a hierarchical structure. In a preferable aspect, the relevance is determined based on the application number of times or the application proportion of the rule to at least one first document in the past. In this case, for example, the determination unit 204 determines that the rule is applicable, in a case where a value related to at least one component of the attribute information of the document which is a processing object is greater than a threshold value.

The translation processing unit 202, the determination unit 204, the output unit 206, and the modification unit 210 are mounted as one processor and the functions of the translation processing unit 202, the determination unit 204, the output unit 206, and the modification unit 210 are realized by executing a translation application program stored in the memory 216.

The output unit 206 reflects the result of the determination unit 204 on the output data of the translation processing unit 202 and then outputs the output data to the display 208. The display 208 is a screen of a liquid crystal display or the like, and displays a machine-translated document. The reception unit 212 is an input device such as a keyboard, a mouse, and a touch panel and allows a user to input instructions of modification to the displayed translation document or a confirmation instruction of the modified contents. The modification unit 210 generates a translation rule corresponding to the modification received at the reception unit 212. The memory 216 stores a translation application program in addition to an OS. The communication unit 214 is a communication interface for performing transmission and reception data with the information processing apparatus 100 such as a LAN.

Figure 6:
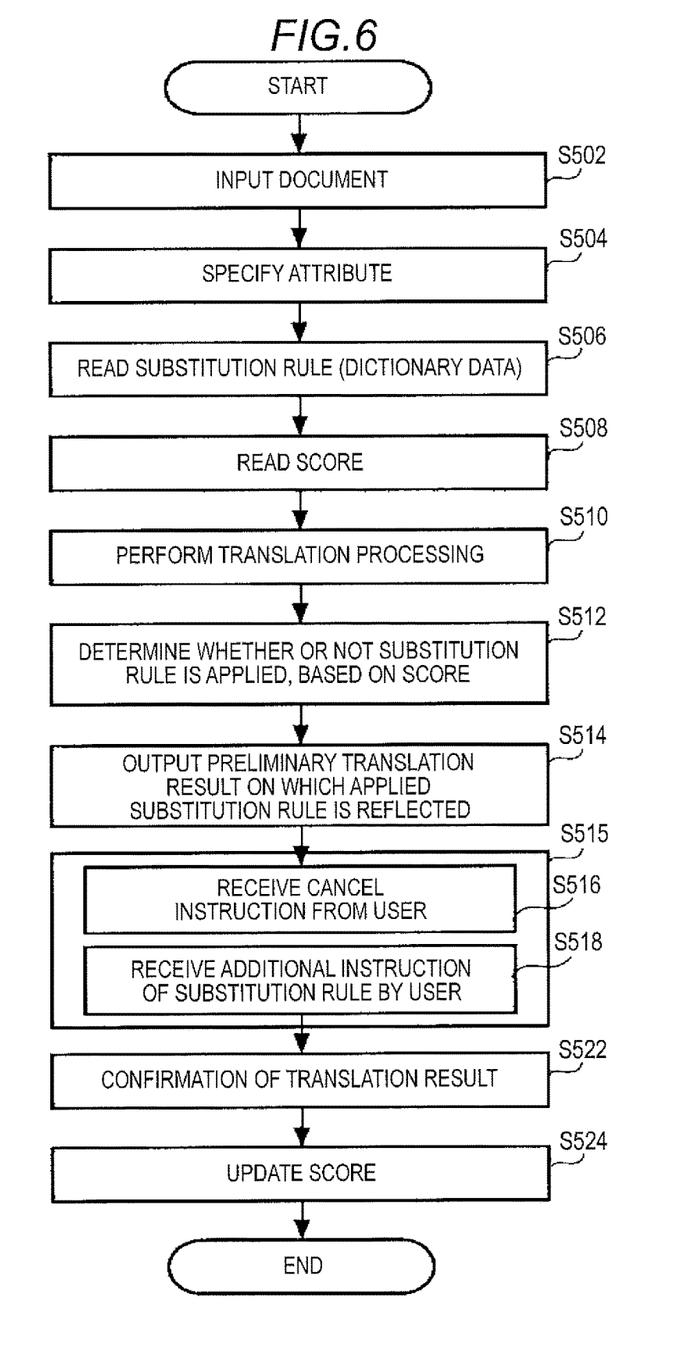
FIG. 6 is a view illustrating an example of an operation of the information processing system.

FIG. 6 is a view illustrating an example of an operation of an information processing system 10. The information processing apparatus 100 specifies document which is a translation object according to request of a user and then acquires the data thereof (text files or the like) (S502). Subsequently, the information processing apparatus 100 determines attributes of the document, based on attribute information contained in a storage location of the data or a text file (S504). The dictionary data which is a cluster of rules to be referred in the translation processing of the document is read from the database DB1. Scores to the entirety of the rules which constitutes the dictionary data corresponding to each component constituting the determined attribute information are read (S506). The document data, the dictionary data and the score data are sent to the information processing apparatus 200.

The translation processing unit 202 performs the translation processing to the document using the dictionary data according to the predetermined algorism. (S510) The determination unit 204 determines appropriateness of the rule in a case where character strings corresponding to the rule registered in the dictionary data are detected in a sentence of the translating object (S512). For example, in a case where the score of each rule is represented as a value of 0 to 1 ({proportion employed by a user}÷ {number of times applied as a preliminary translation result and proposed to user}) and an index value related to at least one component of the attribute information of the document which is a processing object is greater than a predetermined threshold value (for example, "0.8"), the determination unit 204 determines that the rule is applicable.

Further, in a case where the score to the rule is not registered into the entire attribute element constituting the attribute information of the document of the object (that is, in a case where the score corresponding to the rule does not exist in the document including attributes as the component of the attribute element in the past), the object compared with the threshold value does not exist. However, in this case, exceptionally, it is determined that the rule is applicable, The output unit 206 displays the translation result on which the determination result of the translation processing unit 202 and the determination unit 204 is reflected on the display 208 (S514).

A user checks the translation result and then performs modification to a part of which translation is considered to be inappropriate (S515). Specifically, for the translation result of the text document, a user removes words or phrase considered to be inappropriate and then performs an editing operation of the character strings such as a re-entering operation of words or phrase considered to be appropriate. Specifically, the information processing apparatus 200 determines whether the edit received from a user corresponds to cancel of the existing rule (is not employed) (S516), or whether the edit received from a user corresponds to addition of a new rule (5518) (or whether corresponds to both cancel and addition of the rule).

Figure 2:
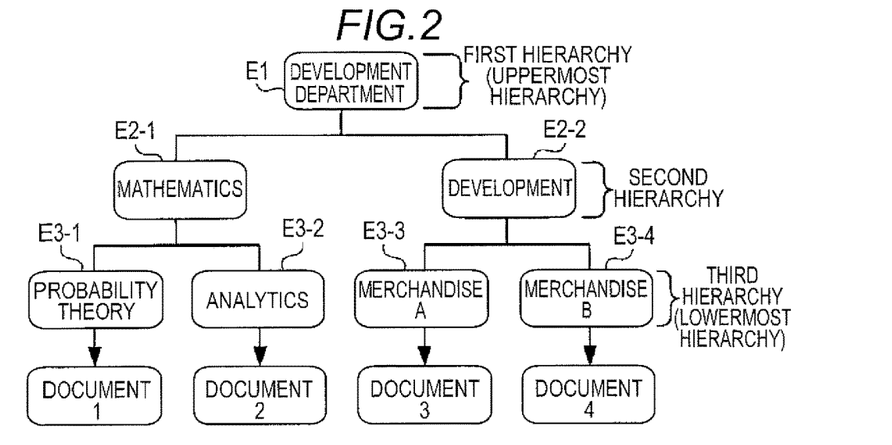
FIG. 2 is a schematic view illustrating a hierarchical structure of attributes of a document.

For example, in a case where the rule of FIG. 2 is included in the dictionary data and "Abcde" is modified into "A_b_c_d_e" in the translation result, the information processing apparatus 200 determines that the substitution rule R5 is not employed. In a case where "okorisounakoto" is modified into "kakuritsu", the information processing apparatus 200 determines that the substitution rule R1 is not employed and {"probability" (before the substitution) →"kakuritsu" (after the substitution)} is added as a new substitution rule R6. Further, the information processing apparatus 200 determines that, for the rule which is not cancelled, the rule is applicable.

If a user confirms the edit contents by performing the predetermined operation, the information processing apparatus 200 generates a document data reflected the confirmed edit contents and then confirms the translation result (S522). Then, the information processing apparatus 200 generates information representing on whether or not each rule is applied and then sends the information to the information processing apparatus 100. The contents of the database DB2 is updated in the information processing apparatus 100 based on the information received from the information processing apparatus 200 (S524).

Hereinafter, a method of a register and update of the score will be described. First, using FIG. 7A and FIG. 7B, an example of update of the score will be described in a case where the entire information is not stored in the database DB2 or the score of the extracted rule is registered without being related to the entirety of the attribute elements.

Figure 7A:
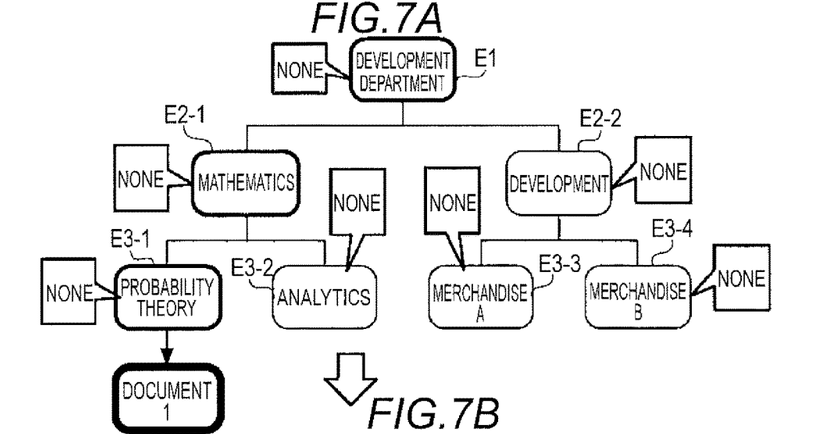
FIG. 7A and FIG. 7B are views illustrating examples of scores newly registered according to translation processing for document.

A translation to document 1 having attributes which include attribute elements E1, E2-1, and E3-1 illustrated in FIG. 7A is performed. Accordingly, it is assumed that only three substitution rules R1, R2, and R3 as rules conforming to the document are extracted from the dictionary data in S512. Here, a state where any of the substitution rules R1, R2, and R3 does not correspond to the entirety of the attribute elements E1, E2-1, and E3-1 is registered. For this reason, in a case where it is registered that any rule does not corresponds to any attribute element related to the document, it is determined that the rule is applicable in the S512. In this case, the translation result to which the entirety of the substitution rules R1, R2, and R3 is applied is proposed to a user.

Here, in S518, in a case where a user checks the translation result, and thus a user determines that modification to the entirety of the translation result including parts related to the substitution rules R1, R2, and R3 is not required (that is, in a case where the machine translation result is employed as it is), the translation result is determined as it is proposed.

In a case where it is registered that any rule does not correspond to any attribute element related the document, information representing application of the score is generated corresponding to the entirety of the attribute elements constituting the attribute information of the document in S524. Specifically, information representing that it has been employed once (+1) is generated in each of the attribute elements E1, E2-1, and E3-1 related to the substitution rule R1. Similarly, information (+1) is generated in the substitution rules R2 and R3. As a result, in the information processing apparatus 100, as a score of the substitution rule R1, information that is 1/1 (once is proposed, once is employed)=1 is registered to correspond to the attribute element E1, E2-1, and E3-1 respectively. Similarly, in the substitution rules R2 and R3, the score which is 1/1=1 is registered to correspond to each of the attribute element E1, the attribute element E2-1, and the attribute element E3-1 (see FIG. 7B).

Figure 7B:
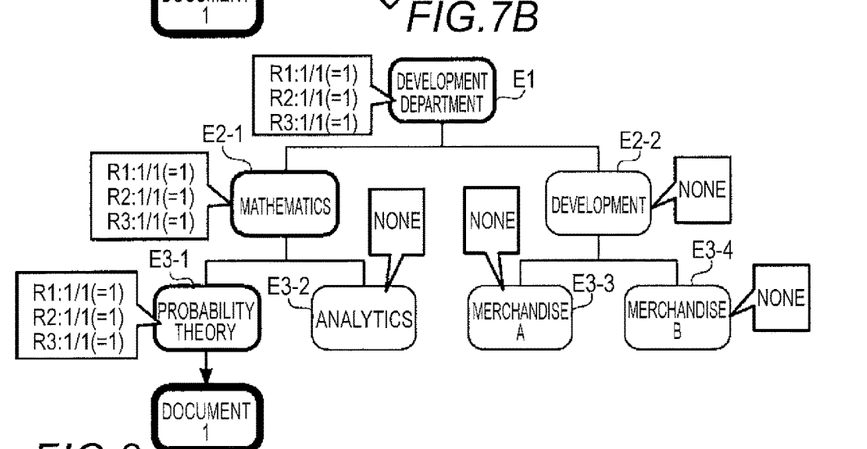

On the other hand, in S516, in a case where a user cancels only the substitution rule R1, for example, scores which are 0/1 for the substitution rule R1, 1/1=1 for the substitution rule R2, and 1/1=1 for substitution rule R3 are registered, corresponding to each of the attribute elements E1, E2-1, and E3-1.

Hereinafter, each time a document different from document 1 is specified as a translation object, in S512, an index value representing application validity of the rule is determined based on the score of the rule corresponding to the attributes of the object document and thus the threshold value and the determined index value are compared to each other.

Application of the rule is determined based on the comparison result and the translation result on which the determined appropriateness thereof is reflected is proposed in S514. The applied result reflects the result of the modification thereof in a case of modification by a user and is reflected on the score stored to the database DB2 (S515 and S524).

Figure 8:
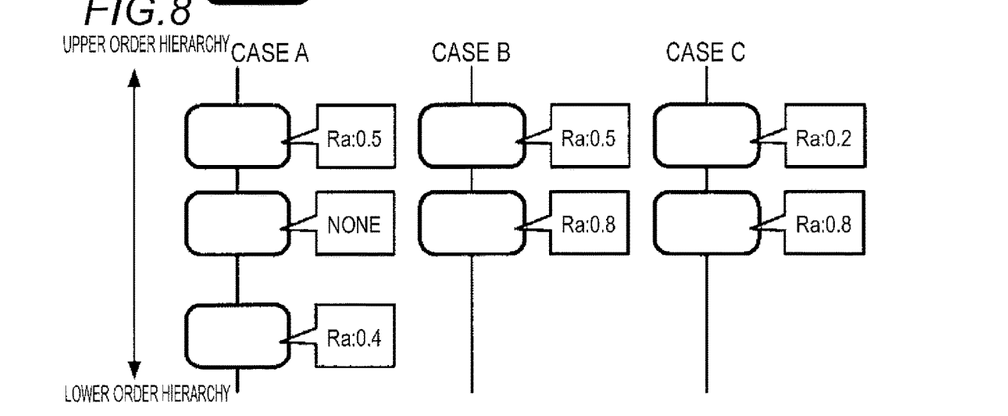
FIG. 8 is a view illustrating a method that determines an index value for each rule, based on information stored in the database.

FIG. 8 is a schematic view illustrating a method that calculates an index value for each rule, based on the score acquired from the database DB2, in S512. First, in principle, if the score related to the component constituting the attributes of the document of the translation object exists, the entirety of the scores is extracted and thus the extracted score becomes an index value corresponding to attribute of the extracted score. For example, in a case A of FIG. 8, 0.5 as the score of the substitution rule R1 and 0.4 as the score of the substitution rule R2 are extracted.

As in case B of FIG. 8, however, in a case where values different from each other in plural elements to the same rules are registered, as an exceptional processing of the above-mentioned case A of FIG. 8, the score belonging to the lower order of hierarchy is determined as an index value. In the case B of FIG. 8, the index value of the substitution rule Ra is "0.8". The reason for calculating in this manner is because the relevance is assumed to be higher between the documents in which lower order of the attribute element is common. In other words, the attribute information of the processing object document includes a first component and a second component belonging to the lower order of hierarchy than the hierarchy of the first component.

In a case where scores are different from each other or the same rules are related to each other in the first component and the second component, as an index of the rules, the score related to the second component is used as an index value.

In a case where a specific relationship has between the plural rules, the index value may be calculated based on the relationship. Specifically, as in case C of FIG. 8, in a case where two rules in which phrases before substitution are same with each other and phrases after substitution are different from each other exist, an index value is calculated by employing only score of substitution rule of rule corresponding to the lower order of element. In an example of case C of FIG. 8, while "0.8" which is the same as the score is calculated as an index value of the substitution rule Ra', the index value of the substitution rule Ra is calculated as "0". In other words, the attribute information of second document which is object document includes a first component and a second component belonging to the lower order of hierarchy than that of the first component, and the rules include a first rule and a second rule.

In a case where the character strings before substitution are common and the character strings after substitution are not common in the first rule and the second rule, as a character string after substitution related to rule, the character string after substitution related to second rule is preferentially output than the character string after substitution related to the first rule.

Hereinafter, a case where the translation according to a determination method of the index value described above is performed will be described. Further, a threshold value is set to "0.8".

Figure 9A:
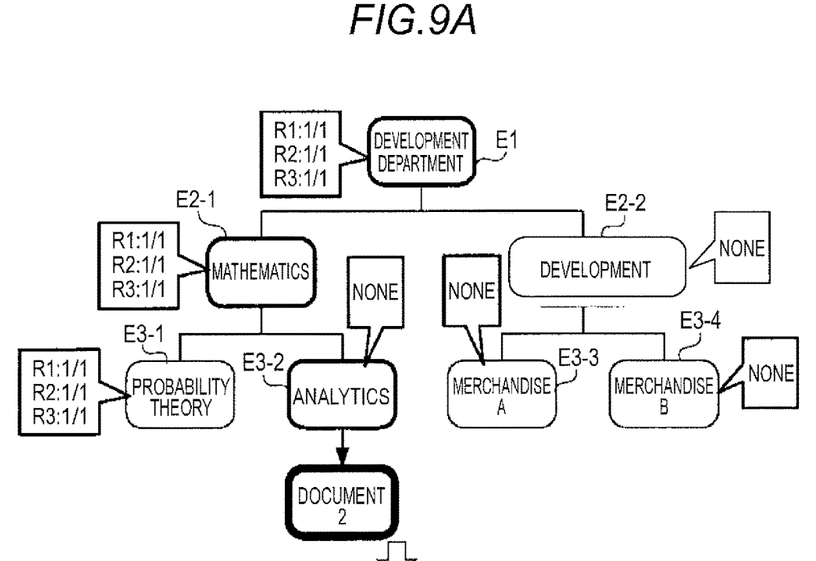
FIG. 9A and FIG. 9B are views illustrating an update result of scores according to translation processing for document.

In addition, in a case where the score which is stored in the database DB2 is illustrated as FIG. 9A (in a state of being same as FIG. 7B), document 2 of attributes having the attribute elements E1, E2-1, and E3-2 is a translation object. In other words, score "1" in the substitution rule R1, score "1" in the substitution rule R2, and score "1" in the substitution R3 are registered respectively in the attribute elements E1 and E2-1, and nothing is registered in the attribute element E3-2.

Figure 9B:
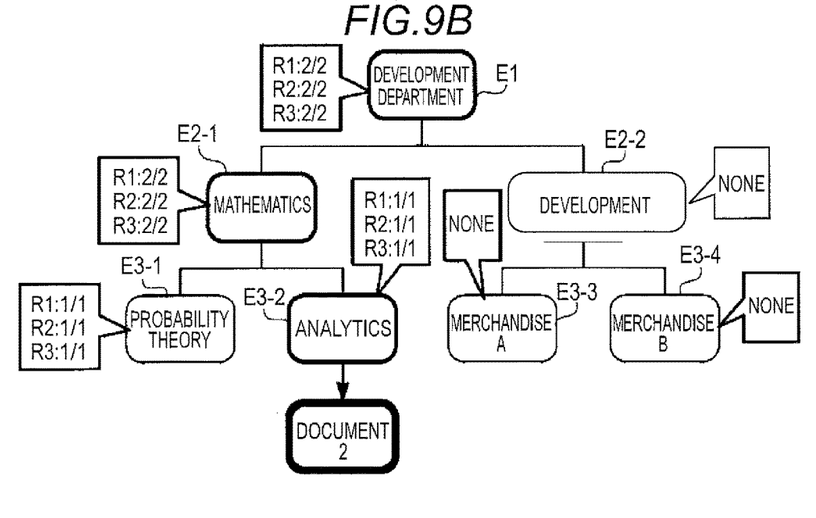

As a result, in S512, with respect to document 2, score to corresponding to the attribute element E2-1 is employed and the index values of the substitution rules R1, R2, and R3 are "1", "1", and "1", respectively. Then, in S514, the comparison between the index value and threshold value with respect to each rule is performed. In a case of 1>0.8, it is determined that the entirety of the substitution rules R1, R2, and R3 are applied. As a result, the translation result of document 2 to which the entirety of the substitution rules R1, R2, and R3 is applied is proposed. If a user is not particularly dissatisfied with this result and thus is not input the modification instruction, the information which is the substitution rule R1=+1, the substitution rule R2=+1, and the substitution rule R3=+1 is sent to the information processing apparatus 100. As a result, in the information processing apparatus 100, the rule and the score thereof corresponding to each of the attribute elements E1, E2-1, and E3-2 are updated. As a result, the score values stored in database DB2 are illustrated in FIG. 9B.

Figure 10A:
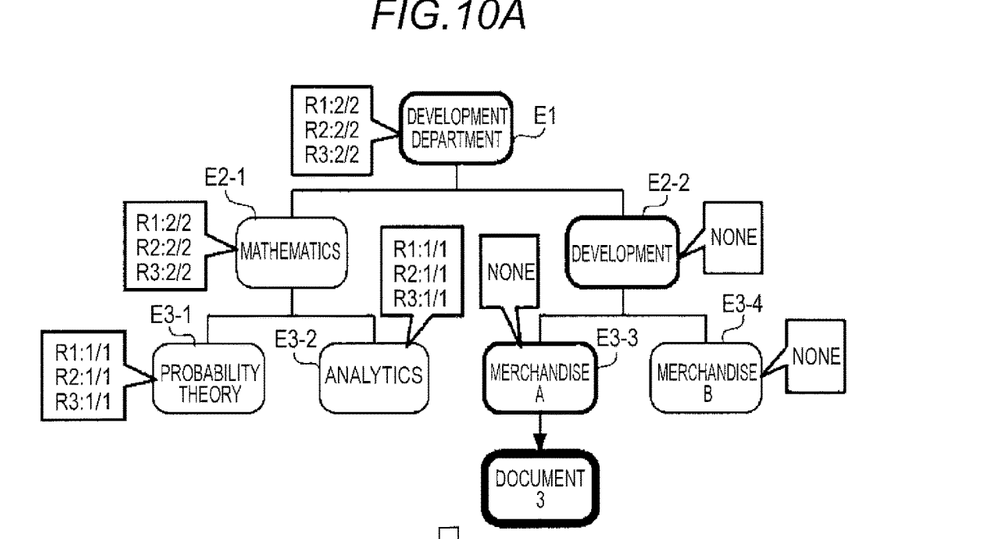
FIG. 10A and FIG. 10B are views illustrating an update result of scores according to translation processing for document.

After that, document 3 having the attribute elements E1, E2-2, and E3-3 is specified to the object of translation processing. As illustrated in FIG. 10A, with respect to document 3, since the index values of the substitution rules R1, R2, and R3 are calculated as "1", "1", and "1" (>the threshold value) respectively, in S512, the entirety of the substitution rules R1, R2, and R3 is applied as substitution objects of document 3.

Figure 10B:
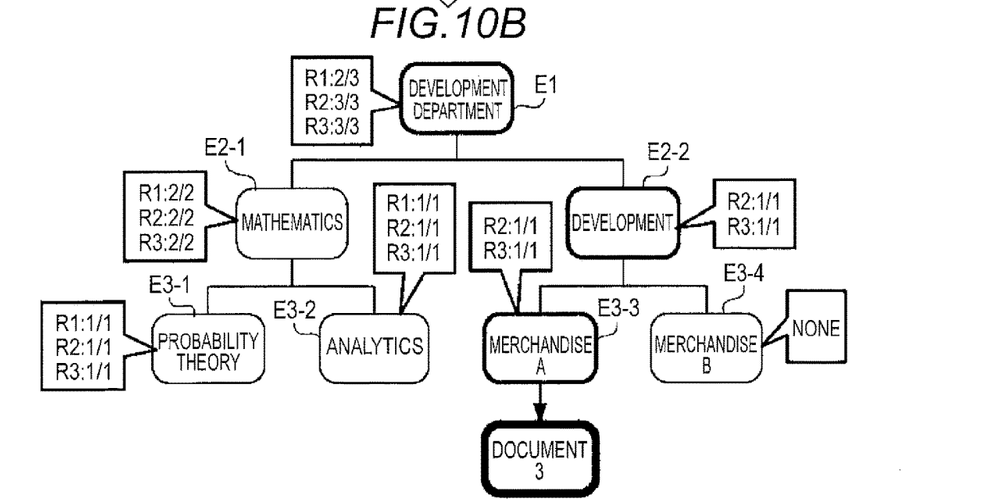

Here, in S516, a user cancels the substitution rule R1. For example, if a user determines that "kakuritsu" is tentatively adopted as a translation of "probability" and "kakuritsu" is inappropriate as a translation in document 3, "kakuritsu" is operated to be modified to "okorisounakoto", and then the modified contents are confirmed. Then, the modification unit 210 reflects the modification result on the translation result and the modification result is reflected on the score. In other words, since current substitution rule R1 is not adopted, information which is {R=+0, R2=+1, R3=+1} is generated, as a result, the database DB2 is updated as in FIG. 10B. In other words, in each of the attribute elements E2-2 and E3-3, while the scores of substitution rules R2 and R3 are maintained, the rule of the substitution rule R1 corresponding to the attribute element E1 is changed from "1" to "⅔=0.67". The fact that the substitution rule R1 is not adopted means that the substitution rule R1 is reflected on the score of the substitution rule R1 corresponding to the attribute element (in this case, the attribute element E1) that corresponds the relevance of document 3 and document 1.

Figure 11A:
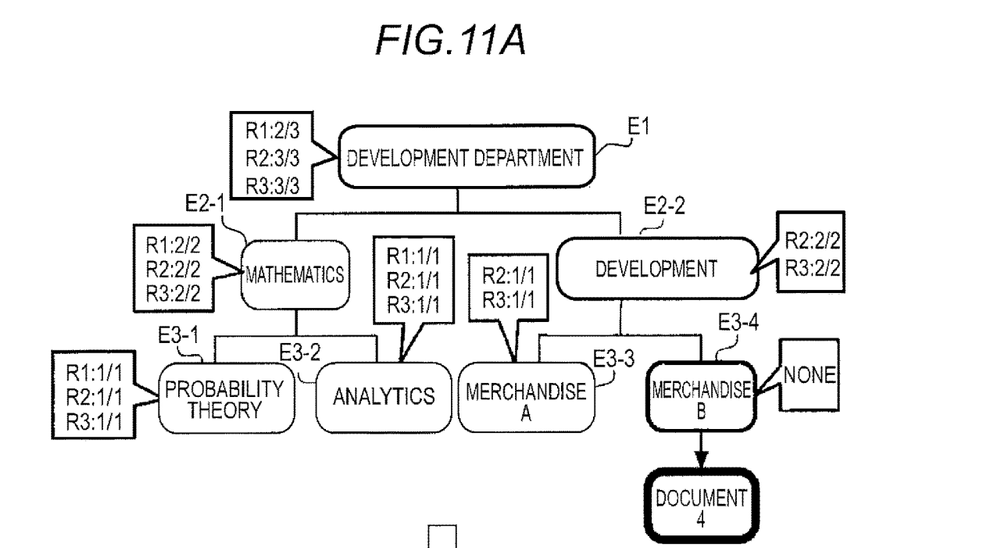
FIG. 11A and FIG. 11B are views illustrating an update result of scores according to translation processing for document.
Figure 11B:
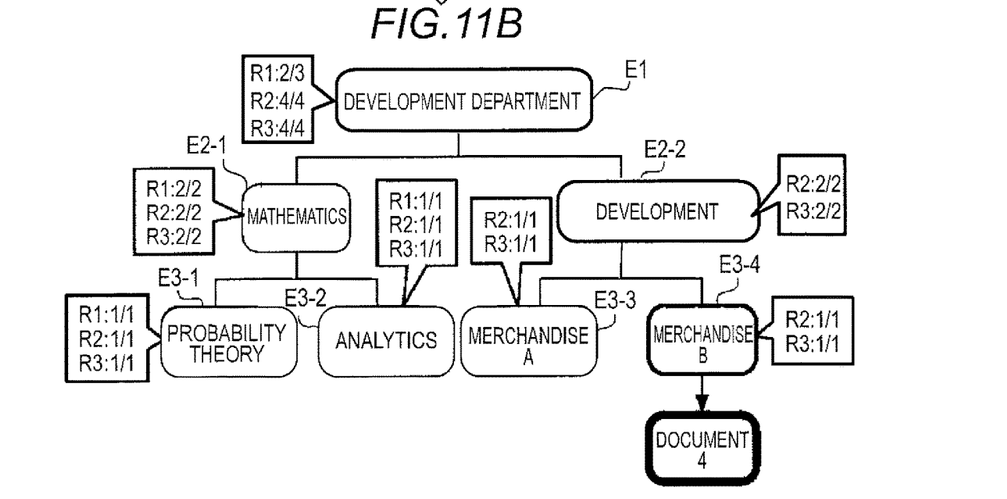

After that, the translation processing corresponding to document 4 having the attribute elements E1, E2-2, and E3-4 is performed. At this time, because the score is in a state of FIG. 11A, the score of the rule with respect to the document is calculated as 1 with respect to the substitution rule R2, 1 with respect to the substitution rule R3, and 0.67 with respect to the substitution rule R1. Because 0.67<a threshold value, or 1>a threshold value, it is determined that the substitution rules R2 and R3 are applied and the substitution rule R1 is not applied in S512. As a result, only the substitution rules R2 and R3 are reflected on the translation result. If the modification is not performed by a user with respect to the translation result of document 4, the information {R2=+1, R3=+1} is generated and thus the score is updated as illustrated in FIG. 11B.

Figure 12:
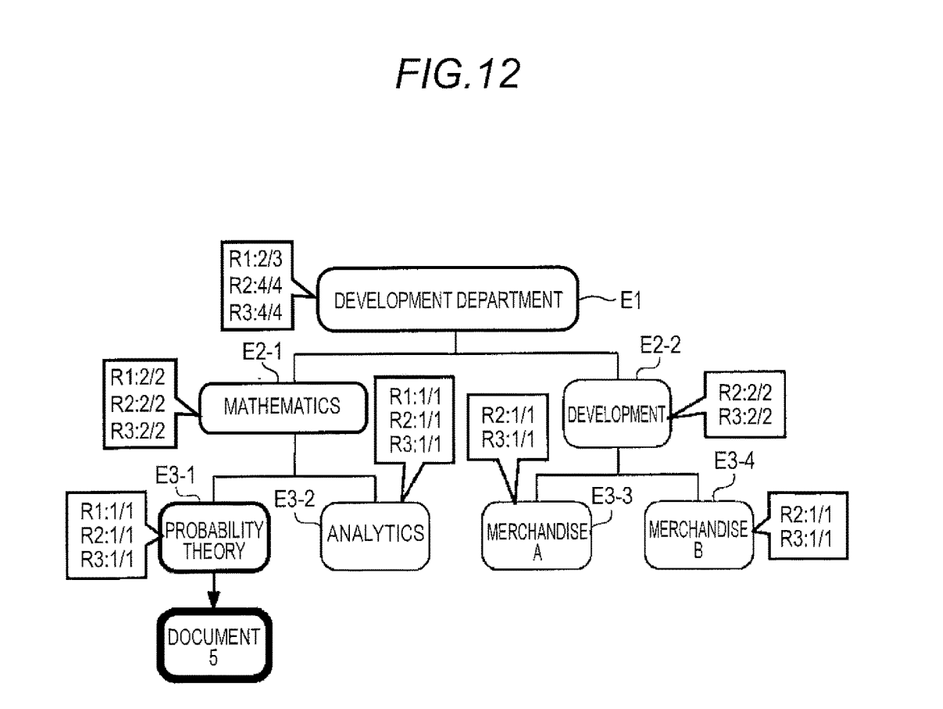
FIG. 12 is a view illustrating an update result of scores according to translation processing for document.

After that, a translation processing with respect to document 5 of which attributes are completely the same as document 1 is performed (see FIG. 12). In S512, with respect to the substitution rule R1, the score which is 0.67 is registered in the attribute element E1, and the scores which are "1" are registered in the attribute elements E2-1 and E2-2.

However, if the rule of FIG. 8 is applied, the score "1" corresponding to the attribute element E3-1 of a lower order hierarchy than that of attribute elements E2-1 and E2-2 is calculated as an index value. If 1>a threshold value, the substitution rule R1 is applied to document 5. As a result, with respect to document 5, the application result of rule in document 4 which is estimated as having low relevance of document is not reflected as it is, and the same application result as the application result of rule in document 1 which is estimated as having high relevance of document or in document 2 which is closer to document 1 is employed.

In this way, in the present example, in any document, if determination of appropriateness (that is, determination of priority in which the rule should be applied as it is) of modification performed by a user to any rule is likely to be reflected as a documents have high relevance with each other (that is, as the common attribute elements are presented in more lower order).

Contrary, as the documents have lower relevance with each other (the extent in which the common attribute elements exist but the attribute elements are positioned at higher order or in a case where the common attribute does not completely exist), the determination of appropriateness is unlikely to be reflected.

In this way, by repeating the translation method of the present exemplary embodiment of the invention for plural documents having different attributes from each other, the attributes (relevance) between the documents are reflected on the score stored in the database DB2. As a result, if the information of the database DB2 is referenced, the information of the database DB2 is employed regardless of the field of the document for the modification rule (that is, it is a general and universal rules) widely applied regardless of the field.

The information of the database DB2 is automatically adjusted to be employed to only the document having high relevance to the field with respect to the rule applied to only the document of the specified field. Then, as the translation processing for the various attributes of documents is performed, validity determination as to whether or not the rule is employed is more secured without depending on the attributes of the object document. As a result, stabilization of the quality of the translation is expected.

In this way, in the example described above, accuracy of the translation is improved by increasing the validity of the determination whether or not each rule included in the dictionary data is a rule which is suitable to the document which is processing object. Therefore, it is not required that plural dictionary data finely customized each document or each attribute of the document in order to increase the accuracy of translation is prepared in advance.

Application object of the information processing method of the present exemplary embodiment is not limited to the translation processing or the information processing associated with translation processing. It is only necessary that the information processing is an information processing in which a computer converts data such as input character string according to a predetermined rule, a user can modify the output result, and the fact that modification is performed (or is not performed) by a user is reflected on the next processing, thereby ensuring validity of conversion.

In addition, the information processing method of the present exemplary embodiment may be implemented by an apparatus in addition to the apparatus having functional construction illustrated in FIG. 1. For example, the information processing method of the present exemplary embodiment may be implemented by a computer apparatus including a combination of functions of the information processing apparatuses 100 and 200. In addition, in the computer apparatus described above, the information processing method of the present exemplary embodiment may be implemented by executing program in order to realize the function described above by a processor. In addition, the program may be installed to a general-purpose computer.

The representation method of the score or the calculation method of the index value is not limited to the example described above. In the score or the index value, the information on whether or not at least the rule is applied in the past may be reflected.

For example, each score may be represented by either 0 or 1. In addition, at the time of determination about whether or not the rule is applied, the index value may be calculated using the algorithm other than that in FIG. 8. For example, statistical processing such as weighing score acquired from the database DB2 is performed according to a hierarchy of a component.

In addition, the threshold value used in S512 may be invariable or may be variable. For example, a user may input the threshold value when the translation object is specified, or the threshold value may be calculated based on the score of the database DB2. For example, a threshold value is determined by using statistics such as an average value or most frequent value of the entirety of the scores which are stored in the database DB2. In either case, it is only necessary that the appropriateness of application is determined based on the information on whether or not the rule in the past is applied and the relevance between the document which is the application object and the document which is object of the current processing.

In short, the information processing apparatus of the present exemplary embodiment may include an acquisition unit that is applied to at least one first document and acquires information representing a rule with respect to a substitution of character string, an input unit that inputs second document, a determination unit that performs determination about whether to apply the rule to the second document or not, based on relevance between the at least one first document and the second document and whether or not the rule has been applied to the at least one first document in the past, and an output unit that outputs the result of the determination.

The foregoing description of the exemplary embodiments of the present invention has been provided for the purposes of illustration and description. It is not intended to be exhaustive or to limit the invention to the precise focus disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor programmed to:
receive modification to a translation result of at least one first document from a user;
generate a translation rule corresponding to the received modification;
receive original texts of at least one second document; and
utilize the generated translation rule at the time of translating the received original texts, depending on relevance between the at least one first document and the second document, and based on a proportion of: (a) a number of times an application of the translation rule is accepted without receiving the modification by the user in a translation result to which the translation rule has been applied in the at least one first document; to (b) a total application number of the translation rule in the translation result to which the translation rule has been applied in the at least one first document.

2. An information processing apparatus comprising:
at least one processor programmed to:
receive modification to a translation result of at least one first document from a user;
generate a translation rule corresponding to the received modification;
receive original texts of at least one second document; and
utilize the generated translation rule at the time of translating the received original texts, depending on relevance between the at least one first document and the second document, and based on relevance of a hierarchical structure between the first document and the second document.

3. The information processing apparatus according to claim 1,
wherein the at least one processor is further configured to utilize the translation rule when an index value that represents a proportion that the translation rule has been applied to the at least one first document and is calculated for each component in the hierarchical structure is greater than a threshold value.

4. The information processing apparatus according to claim 3,
wherein when attribute information in the hierarchical structure of the second document includes a first component and a second component belonging to a lower hierarchy than that of the first component, and the same translation rule is applied to the first component and the second component while the index values of the first component and the second component are different from each other, the at least one processor is further configured to utilize an index value associated with the second component as an index of the translation rule.

5. The information processing apparatus according to claim 3,
wherein when attribute information in the hierarchical structure of the second document includes a first component and a second component belonging to a lower hierarchy than that of the first component, the first component includes a first rule, and the second component includes a second rule, the translation rule according to the second rule is preferentially utilized.

6. The information processing apparatus according to claim 3, further comprising:
a memory in which the index value is stored;
a display that displays the generated translation result,
wherein the at least one processor is further configured to:
receive from a user a designation of whether or not to apply the translation rule to the second document;
update the index value stored in the memory with respect to the translation rule, based on the received designation.

7. A non-transitory computer readable medium storing a program causing a computer to execute a process, the process comprising:
receiving modification to a translation result of at least one first document from a user;
generating translation rules corresponding to the received modification;
receiving original texts of at least one second document; and
utilizing the generated translation rule at the time of translating the received original texts, depending on relevance between the at least one first document and the second document, and based on a proportion of: (a) a number of times an application of the translation rule is accepted without receiving the modification by the user in a translation result to which the translation rule has been applied in the at least one first document; to (b) a total application number of the translation rule in the translation result to which the translation rule has been applied in the at least one first document.

* * * * *